United States Patent Office.

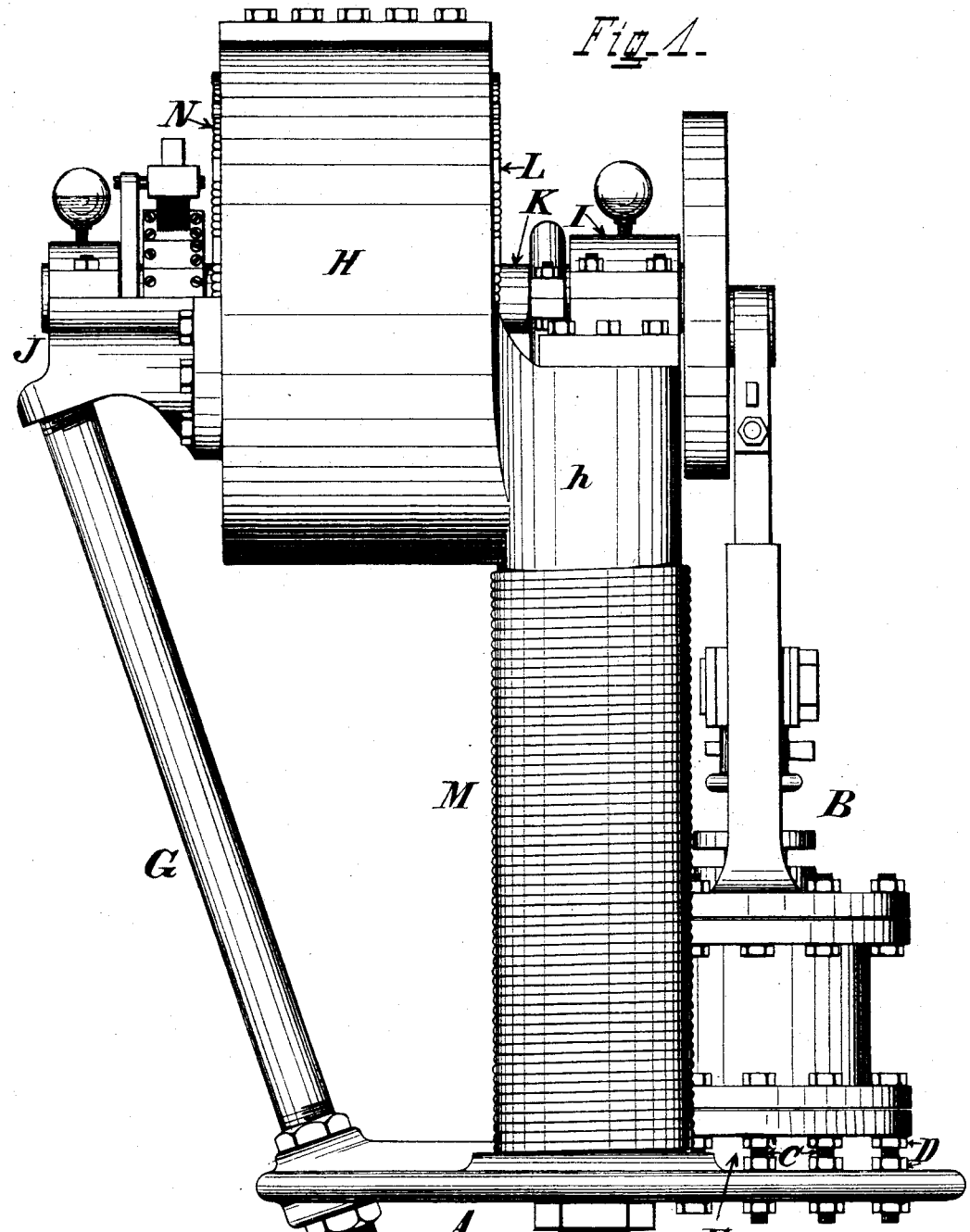

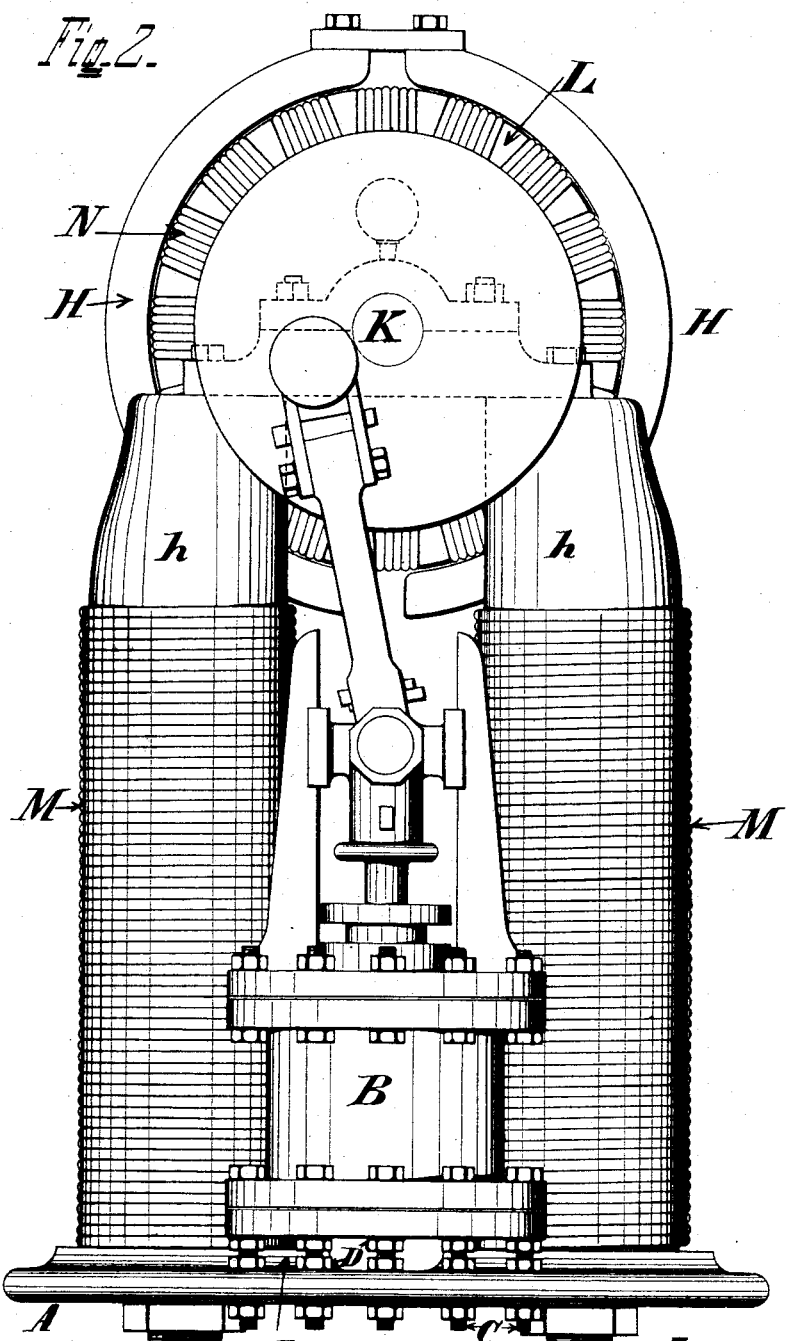

LEONIDAS G. WOOLLEY, OF DAYTON, OHIO, ASSIGNOR, BY MESNE ASSIGNMENTS, TO THE OHIO POWER AND LIGHT COMPANY, OF SAME PLACE.

COMBINED STEAM-ENGINE AND ELECTRIC GENERATOR.

SPECIFICATION forming part of Letters Patent No. 286,985, dated October 16, 1883.

Application filed June 21, 1883. (No model.)

*To all whom it may concern:*

Be it known that I, LEONIDAS G. WOOLLEY, of Dayton, Montgomery county, Ohio, have invented a new and useful Combined Steam-Engine and Electric Generator, of which the following is a specification.

The invention is designed to secure economy of space, material, and motive force, together with avoidance of excessive heat in the current-carriers, and, while more especially intended for operating electric lights on locomotives and steamboats, is also applicable to stationary plants employed in electric lighting and other uses to which electric currents are applied.

In the accompanying drawings, Figure 1 is a side view, and Fig. 2 a front elevation, of a combined steam-engine and electric generator embodying my invention.

A represents a cast-iron base or bed-plate; B, a steam-engine whose cylinder is so attached by means of bolts and nuts C D to said bed-plate as to leave a ventilating-space, E, between the bed-plate and the superincumbent steam-cylinder.

Securely screwed or bolted to the bed-plate are two vertical posts, F F, and one oblique post, G. The posts F F are wrought-iron rods or cylinders, whose upper ends screw into eyes *h* of two laterally-extending pole-pieces, H H, which are preferably composed of "soft" cast-iron, and which support the front bearing, I, of the steam-engine crank-shaft K, whose portion within the pole-pieces carries an armature, L, of any desired type, with which said pole-pieces are, of course, concentric. The post G, (which is preferably manufactured from gas-pipe or other wrought-iron tubing) screws at its upper end into the rear bearing, J, of the crank-shaft K, which bearing is bolted to the rear side of the polar extensions H H. The field and armature are, of course, provided with suitable helices, M N. The shaft-bearings are composed of any suitable non-magnetic metal, such as phosphor-bronze.

The described adaptation of a steam-engine and an electric-current generator possesses several important advantages. For example: The explained utilization of the crank-shaft pedestals as the field-cores of the generator dispenses with the necessity and saves the room and expense of additional pieces of metal for the cores, while the motor and work are brought into the most advantageous relation for economy of space, power, and material, with freedom from vibration, overheating, &c. The line of direction of engine-thrust being brought into closest possible proximity to the principal shaft-bearing further tends to reduce side strain and vibration to a minimum, and to economize space, material, and motive power.

The great importance of guarding the field-helix from extraneous heating influences is apparent in view of the well-known tendency of electric-current carriers to suffer increase of temperature. The evil of extraneous heating is usually sought to be avoided by more or less distant location of the steam-engine and current-generator; but such remedy being impracticable within the compact dimensions of the present device, a means of thermal insulation that does not seriously detract from the desired compactness becomes of vital necessity. These conditions are believed to be satisfied by the construction hereinbefore described.

The above-described preferred form of my invention may be modified in various non-essential particulars. For instance: a filling of asbestus or other substance of slow heat-conducting power may take the place of the ventilating-space E between the bed-plate and the superincumbent steam-cylinder, or projecting teats, instead of the described nuts, may be employed, while hot air or other source of power may be used in place of steam.

I claim herein as new and of my invention—

1. In a combined steam-engine and electric generator, the combination, with the attached bed-plate, and with the attached field-magnet pole-pieces, that support the journal-bearings of the combined armature and crank shaft, of the engine-pedestals F F, said pedestals being wound with the field-helix wire, substantially as and for the purpose set forth.

2. In a combined steam-engine and electric generator, the combination, with steam-engine crank-shaft K, (carrying armature L,) of the lateral projections H H, (serving as pole-pieces and shaft-bearings,) from the columns F F, (serving as field-magnet cores and engine-pedestals,) substantially as set forth.

3. In a combined steam-engine and electric generator, the combination of bed-plate A, steam-engine B, the pedestal field-magnet cores F F, having the lateral polar extensions H H, the rear post, G, and the crank-shaft K, with its attached armature L, substantially as set forth.

4. In a combined steam-engine and electric generator, the combination, with bed-plate A, having the attached field-magnet cores F F, of the bolts C and nuts D, and the thereby attached and thermally-insulated steam-engine B, substantially as set forth.

In testimony of which invention I hereunto set my hand.

LEONIDAS G. WOOLLEY.

Attest:
GEO. H. KNIGHT,
SAML. S. CARPENTER.